Figure 1:
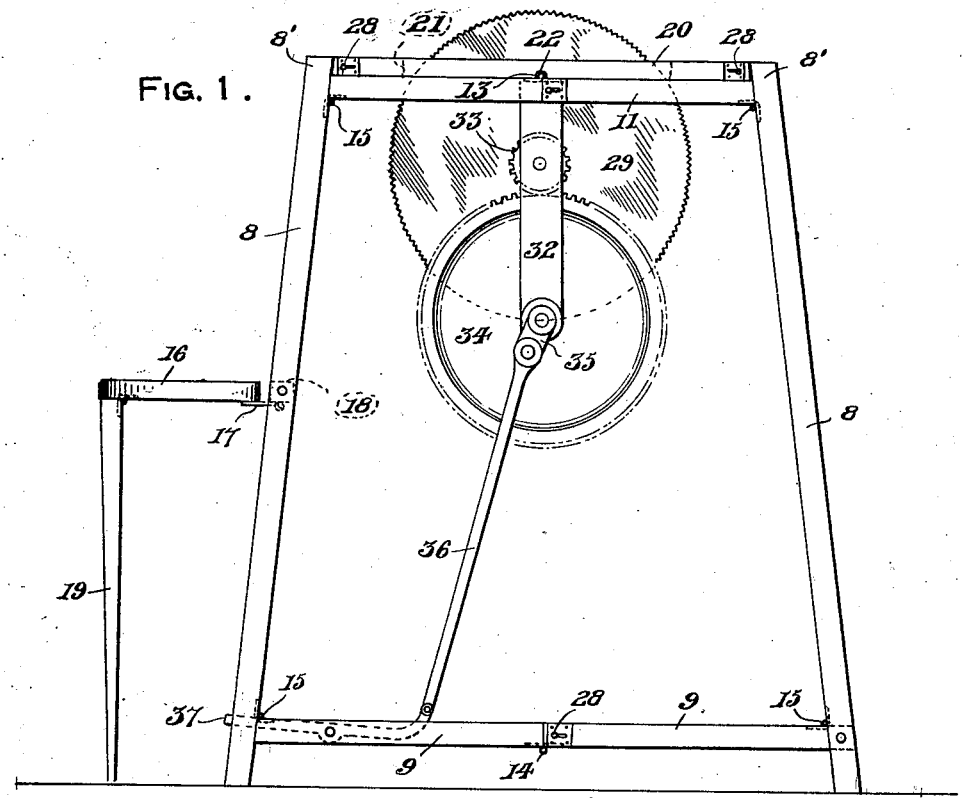

V. NIEWINSKI.
ADJUSTABLE SAW FRAME.
APPLICATION FILED MAY 10, 1919.

1,313,107.

Patented Aug. 12, 1919.
2 SHEETS—SHEET 1.

Inventor
V. Niewinski

By R. Morgan Elliott & Co.
Attorney

V. NIEWINSKI.
ADJUSTABLE SAW FRAME.
APPLICATION FILED MAY 10, 1919.
1,313,107.
Patented Aug. 12, 1919.
2 SHEETS—SHEET 2.
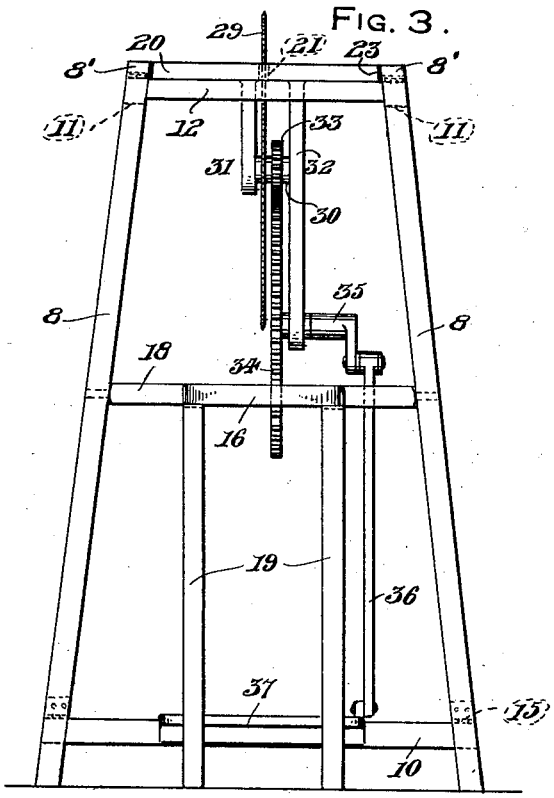
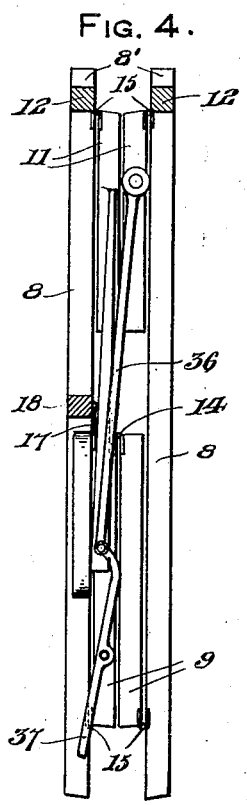
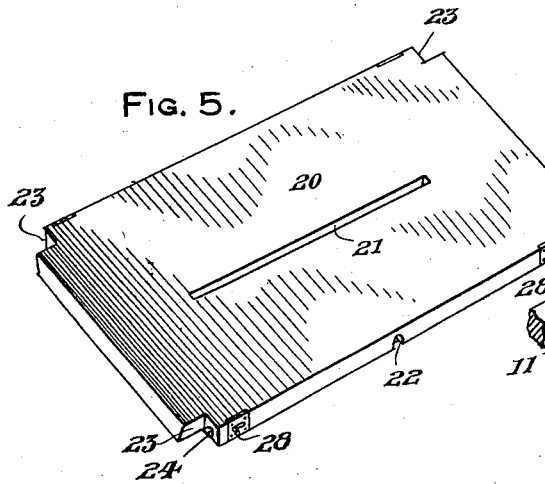
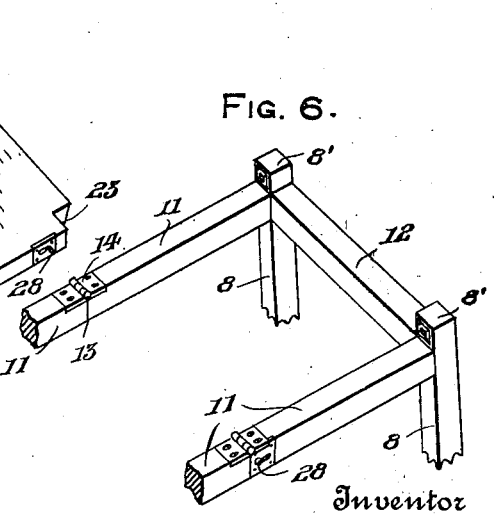
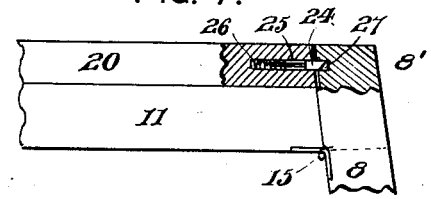
Inventor
V. Niewinski
By R. Morgan Elliott & Co.
Attorney

UNITED STATES PATENT OFFICE.

VICTOR NIEWINSKI, OF ST. PAUL, MINNESOTA.

ADJUSTABLE SAW-FRAME.

1,313,107.        Specification of Letters Patent.        Patented Aug. 12, 1919.

Application filed May 10, 1919. Serial No. 296,142.

*To all whom it may concern:*

Be it known that I, VICTOR NIEWINSKI, a citizen of the United States of America, residing at St. Paul, in the county of Ramsey and State of Minnesota, have invented certain new and useful Improvements in Adjustable Saw-Frames, of which the following is a specification.

The primary object of the present invention is to provide a collapsible supporting framework for a revolving saw in which the saw extends through a guide slot in the table top, it being understood that a grinding stone or other suitable implement may be substituted for the saw if desired.

A further object of the invention is to provide a collapsible framework or saw frame for a revolving saw that is extremely simple in construction and one that is easy and inexpensively manufactured, but still retaining sufficient strength and durability to withstand the heavy usage which is expected of a machine of this character.

With the above and other objects in view, the invention consists in the novel form, combination and arrangement of parts hereinafter more fully described and shown in the accompanying drawings in which like reference characters indicate similar parts throughout the several views.

Figure 2:
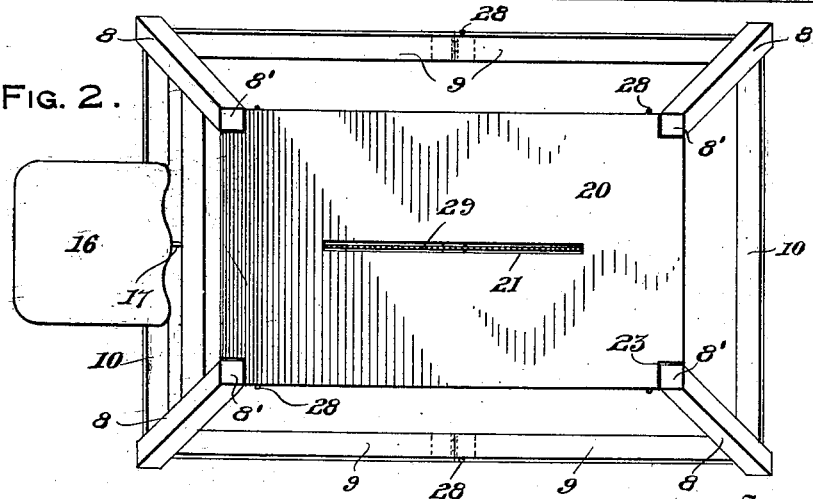

In the drawings,

Figure 1 is a side elevational view of a saw frame constructed in accordance with the present invention, Fig. 2 is a top plan view thereof, Fig. 3 is an end elevational view, Fig. 4 is a view of the supporting frame in collapsed position with the operating gears, saw and direct supporting mechanism for the saw removed therefrom, Fig. 5 is a perspective view of the table top removed from the frame, Fig. 6 is a detail perspective view of the upper portion of the supporting frame, and Fig. 7 is an enlarged fragmentary view, partly in section of an upper corner of the frame showing the latch connection between the table top and the framework.

Describing the invention more in detail, there are provided four corner legs 8, inclined toward an apex, the same being connected at their lower ends by collapsible side bars 9 and rigid end bars 10, while the upper ends of said legs 8 are connected by collapsible upper side bars 11 and rigid end bars 12, so that when the framework is collapsed corresponding end bars will be moved to adjacent positions while the relative positions between the adjacent end bars will remain unchanged. The side bars 9 and 11 are broken midway the ends thereof as shown at 13 and are connected by hinges 14, the hinges upon the upper side bars 11 being positioned at the upper side thereof while the hinges connecting the broken sections of the lower side bars 9 are positioned at the lower sides so that when collapsed as illustrated in Fig. 4, the broken portions of the side bars will be moved toward each other and inwardly of the ends of the supporting legs 8, it being noted that each side bar section is similarly hinged to the adjacent leg by the hinge member 15 to permit the swinging movement of the side bar sections.

A collapsible seat is provided for the saw frame and comprises a seat portion 16 having a hinge connection 17 at is forward end to a cross rail 18 extending between adjacent legs 8 at one end of the frame while supporting lugs 19 are hingedly carried at the outer end of said seat and assume the vertical position as shown in Figs. 1 and 3 when the device is set up for operation.

A removable table top 20 having a central longitudinal slot 21 provided therein is positioned over said connecting side and end rails 11 and 12, the opposite sides of the table top 20 being cut away as at 22 to provide a clearance for the barrels of the hinges 17 while the corners of the table top are cut away as at 23 to provide clearances for the upwardly projecting ends 8′ of the legs 8. A latch mechanism is coöperatingly carried by the table top and projecting ends of the table legs for holding the table top in its proper position and includes a tensioned latch 24 resiliently mounted in an opening 25 provided in the table top 20 with the operative end thereof projecting from said opening by the expansion of the spring 26 and adapted to be received in a keeper opening 27 provided in the upper projecting ends 8′ of said legs 8, this construction being more clearly shown in Fig. 7. In order to remove the table top, it is necessary to withdraw the latches 24 from the keeper 27 and this is accomplished by shifting the radially projecting pin 28 extending outwardly of the side of the table top as shown in Figs. 1 and 5 whereby said latch is removed from the keeper opening and the table top permitted to be removed from the frame. As shown in Figs. 1, 2, and 6, a similar latch mechanism is provided at the broken portions of the side bars 9 and 11 to hold the same in their open operative positions.

Any suitable tool may be carried by the frame, but it is preferably desired that a revoluble saw as is illustrated by the numeral 29, be journaled therein upon the shaft 30 supported in depending arms 31 and 32 with the edge thereof projecting upwardly through the slotted opening 21 in the table top 20 as best illustrated in Figs. 1 and 2. A pinion 33 is fixed upon the shaft 30 and is in mesh with the gear wheel 34 journaled upon the crank arm 35 revolubly supported in the lower end of the arm 32, said crank arm 35 being connected to the abutments 36, and in turn is operated by the treadle 37, so that when the operator is upon the seat 16 the foot will be in position upon the treadle 37 and rotary motion communicated to the revolving saw 29 by means of the abutment, crank and gear mechanisms as is believed to be clearly understood.

The arms 31 and 32 are detachably carried by the table top 20 in any suitable manner and may be readily disengaged therefrom when the supporting frame is to be collapsed as illustrated in Fig. 4 and when so arranged, the seat and supporting legs together with the top and bottom hinged side bars are positioned inwardly of the legs 8.

What I claim as new is :—

1. A collapsible saw frame including corner legs, side connecting bars for said legs hinged at their ends to the legs, said bars being positioned adjacent the lower end of the legs and breakable midway thereof, a latch mechanism associated with each broken portion to hold the side bars in open operative position, a seat hinged to said frame and having supporting legs hinged thereto, the upper ends of the corner legs projecting upwardly beyond the connecting bars, a table top removably supported on said connecting bars with the corners thereof cut away to provide a clearance for the upwardly projecting ends of said corner legs, latch mechanism coöperatively carried by said table top and leg projections and a saw and operating mechanism therefor carried by said frame.

2. A collapsible saw frame including corner legs, side connecting bars for said legs hinged at their ends to the legs, said bars being positioned adjacent the lower end of the legs and breakable midway thereof, a latch mechanism associated with each broken portion to hold the side bars in open operative position, a seat hinged to said frame and having supporting legs hinged thereto, the upper ends of the corner legs projecting upwardly beyond the connecting bars, a table top removably supported on said connecting bars with the corners thereof cut away to provide a clearance for the upwardly projecting ends of said corner legs, latch mechanism coöperatively carried by said table top and leg projections, said table top having a slotted opening therein, a pair of bars depending from said table top at opposite sides of said opening, a saw revolubly supported by said bars and extending upwardly through said table slot, operating gearing for said saw carried by said arms and treadle mechanism carried by said frame operatively associated with said gearing mechanism.

3. A collapsible saw frame including corner legs, side connecting bars for said legs hinged at their ends to the legs, said bars being positioned adjacent the lower end of the legs and breakable midway thereof, a latch mechanism associated with each broken portion to hold the side bars in open operative position, a seat hinged to said frame and having supporting legs hinged thereto, the upper ends of the corner legs projecting upwardly beyond the connecting bars, a table top removably supported on said connecting bars with the corners thereof cut away to provide a clearance for the upwardly projecting ends of said corner legs, latch mechanism coöperatively carried by said table top and leg projections, a saw rotatably carried by said frame and operatively associated with said table top and operating means for said saw carried by said frame.

4. A device of the class described comprising supporting legs, side bars hinged midway their ends and further hinged to said legs, said side bars being positioned adjacent the upper and lower ends of said legs, rigid end bars secured adjacent the upper and lower ends of said legs, latch mechanism associated with the broken portions of said side bars, a table top removably supported upon the upper side and end bars, latch mechanism for holding said table top in operative position coöperatively carried by said table top and supporting legs, a seat hingedly connected to said frame, a saw revolubly supported by said frame and extending above said table top and operating means for said saw.

5. A device of the class described comprising supporting legs, side bars hinged midway their ends and further hinged to said legs, said side bars being positioned adjacent the upper and lower ends of said legs, rigid end bars secured adjacent the upper and lower ends of said legs, latch mechanism associated with the broken portions of said side bars, a table top removably supported upon the upper side and end bars, latch mechanism for holding said table top in operative position coöperatively carried by said table top and supporting legs, a seat hingedly connected to said frame, a saw revolubly supported by the frame and extending above said table top, gearing and a treadle mechanism therefor carried by said frame for communicating rotary motion to said saw, the saw, gearing and direct supporting means being removable from said frame when the frame is in collapsed position.

In testimony whereof I affix my signature.

VICTOR NIEWINSKI.

Copies of this patent may be obtained for five cents each, by addressing the "Commissioner of Patents, Washington, D. C."